Patented Jan. 30, 1940

2,188,468

UNITED STATES PATENT OFFICE 2,188,468

PRESERVATIVE COMPOSITION AND PRODUCTS DERIVED THEREFROM

Charles M. Albion, Boston, Mass.

No Drawing. Application September 21, 1937, Serial No. 164,905

27 Claims. (Cl. 134—12)

The present invention is concerned with compositions of matter adapted to preserve from decomposition rubber latex, other latices, other proteins and substances containing proteins, and a variety of other organic compounds which decompose quickly in ordinary circumstances; and to be combined or incorporated with other substances for a variety of useful purposes. The invention is further concerned with compositions and compounds of which the composition first referred to forms a part and in which other substances are incorporated to produce paints, lacquers, waterproofing and fireproofing agents, etc. The invention comprises a composition, which for the purposes of this description may be called the basic composition because it forms the basis of other useful substances when compounded with other ingredients, as well as being a useful substance in itself; and further comprises useful substances compounded of such basic composition and other ingredients.

In this specification the verb "compound", in its various forms, is used in a generic sense as signifying the act of putting together the ingredients which result in a useful composition, whether the end product is a compound in the chemical sense, a solution, an emulsion, or a mixture of compounds, emulsions or solutions with one another. The term "composition" is used with the meaning attributed to that term in the patent statute, and the noun "compound" with the same meaning, except where the context clearly shows that a chemical compound is meant. The term "basic" is used as signifying that the composition to which it is applied forms the foundation or basis for the production of useful products by addition to or compounding with other substances.

The present application is in part a division, and in part a continuation, of my prior application Serial No. 133,269, filed March 26, 1937, in which the same basic composition is described, together with compounds or compositions thereof with rubber latex or the like and certain other substances. The purpose of the present application is to protect the basic composition and compounds thereof with other substances.

The basic composition consists of three ingredients, namely, a solvent of resins, a plasticiser, and a wetting agent or so called polarizing agent.

The first of these ingredients may be either tetrahydronaphthalene ($C_{10}H_{12}$), or decahydronaphthalene ($C_{10}H_{18}$).

For the second ingredient I may use either hexahydrophenol ($C_6H_{11}OH$) which is a hydrogenated product of phenol, or hexahydrocresol ($C_6H_{10}CH_3O_6$), or any other phenol or cyclic alcohol having similar chemical structure to hydrogenated products of phenol, and similar chemical and mechanical properties in compounded compositions of the character herein referred to.

For the third ingredient I may use sulfonated castor oil, sulfonated olive oil, any of the sulfonated alkylene compounds, including those having the formula of $C_nH_{2n}.10SO_3.Na$, or any other polar compound or combination of polar compounds which will reduce the surface tension and the interfacial tension of liquids.

Compositions made of three such ingredients are soluble in water, in alcohol, in glycerine and in oil.

A preferred example of the basic composition is:

| | Parts |
|---|---|
| Tetrahydronaphthalene | 3 |
| Hexahydrophenol | 1 |
| Sulfonated castor oil | 2 |

These substances are self emulsifying with one another and produce a smooth homogeneous composition. It should be noted, however, that the illustrative relative contents of the several ingredients here given are not exclusive or limiting, but that wide variations may be made within the scope of the invention. Also that any one of the substances in each of the precedently named groups may be compounded with any one of the substances comprehended within each of the other groups, in like proportions or other suitable proportions.

The foregoing basic composition (by which I mean not only the specific composition named, but also all others within the scope of the foregoing description), is a preservative capable of preventing natural rubber latex from decomposing when added to such latex in proportions commensurate with the proportions of other preservatives heretofore used for that purpose. It also has the ability to preserve other latices, other proteins, and other highly nitrogenous substances. On the basis of my present experience I believe it to be a highly effective preservative for all organic compounds which decompose quickly under ordinary circumstances, and that it will preserve such substances indefinitely, or at least amply long enough to permit transportation from the place of origin to the place of use of such organic substances, and a long period of storage before being used or consumed. Relatively minute proportions of the composition, i. e., as small as one half of one per cent. or less, are suitable for this purpose. Much larger proportions may be used, but are not necessary in most cases.

The basic composition is also an aid to the milling of coagulated rubber, in that it shortens, by its peptizing action, the time necessary to reduce the rubber, vulcanizer, and other ingredients to a homogeneous mixture. As low a quantity as less than one per cent., (for instance, one half of one per cent.) by weight of the rubber, in a mix, enables the milling time to be reduced by as much as fifty per cent. Here also the proportional content of the composition may be considerably varied.

The basic composition, with the admixture of urea or urea-ammonia liquor, when added to an alkaline solution of casein, prevents the casein solution from decomposing, gelling, or suffering any appreciable change in viscosity, for long periods of time. The most economical ratios of casein, urea, etc. and the basic composition to one another suitable for this purpose are: five per cent. by weight of urea to casein, and two per cent. by weight of the basic composition to the weight of solids in the urea-casein mixture, together with sufficient ammonia or other volatile solvent to make the solution distinctly alkaline. But, apart from considerations of economy, the proportions can be varied widely, if desired.

The basic composition is a solvent, or a suitable dispersion medium, for oil-soluble dyes, in which one or another of such dyes may be dispersed in quantities sufficient to make a deeply colored clear solution. Such solution may be extended or diluted with water or with any one of a number of other solvents such as alcohol, benzol, toluol, or any one of the solvents of resins set forth precedently in this specification, and may then be spread, brushed or flowed on to any solid material which one desires to color. The basic composition in the coloring compound gives to this compound a remarkable penetrating quality which enables it to permeate deeply within the substance of concrete, wood, crepe rubbers, compounded rubbers and other materials which are impervious to other liquids. If enough of the said colored solution is applied, it will permeate entirely through the solid body to which it is applied. Upon evaporation of the water, the residue becomes waterproof.

The basic composition, when added in small relative contents to any wax, either synthetic or natural, or mixture of waxes, which are then emulsified or dispersed, eliminates the formation of white specks or spots on surfaces to which the wax is applied for finishing, polishing or waterproofing purposes. This use and combination of the basic composition is particularly useful with soft waxes, such as are commonly used for finishing, polishing or waterproofing floors or walls of concrete, wood, rubber, tile or composition.

Mention has previously been made of alkaline solutions of casein preserved by the basic composition added to urea or urea-ammonia liquor. Such a compounded casein solution is adapted to serve as a vehicle for fillers or pigments, or for both a filler and a pigment, in the production of paints. Paints so made have exceptional covering powers, great adhesion to wall surfaces and the like, and are exceptionally free flowing, of easy brushing consistency, and self-leveling. The amount of filler or coloring matter, or both, which may be mixed with the casein composition, may be varied by the user according as a thinner or thicker paint is desired. Such paints are adhesives as well, and like compounds without or with coloring matter may be provided for use primarily as adhesives.

The same compounded casein solution may be mixed with a synthetic wax in proportions sufficient to make a freely fluid liquid. Such wax composition is useful for coating paper, among other uses, and is particularly valuable for this purpose as it is non-inflammable, flexible, and produces a lustrous or semi-lustrous finish superior to that which is obtained by ordinary processes heretofore used.

The basic composition also has utility as a means for making cellulose derivatives readily dispersible in water. Such cellulose derivatives as ethyl cellulose and its equivalents are soluble in the said basic composition, and when dissolved in it are dispersible in water with, to all appearances, the same celerity and completeness as any water soluble liquid or paste. Such water extension of ethyl cellulose or its equivalent makes a good coating material. It may be brought to any consistency which will spread freely, and may be applied in a succession of coats after drying of each preceding coat. The coating thus made is perfectly flexible. The dispersion is extremely economical inasmuch as the vehicle is water. This cellulose dispersion is extremely advantageous in the manufacture of coating material for paper, lacquers, etc. without the use of expensive solvents.

Other paints, varnishes, lacquers, etc. analogous to those hereinbefore described may be made by combining a great many types of resins in their respective solvents, with the basic composition. By means of this composition resins are made readily soluble and extensible virtually without limit, in solvents with which they are not normally or easily soluble, or for which they have only a limited tolerance, and solutions of resins in different solvents, which normally are not miscible with one another, are thereby made sufficiently miscible to produce a satisfactory varnish or paint.

In general it may be said that the quantities of the basic composition used to make any of the foregoing coating preparations are the least amounts which will suffice to make the compositions free flowing and self-leveling, and that as much may be used as needed for the purpose. Narrowly limited proportions are not of the essence of the invention, and for most purposes the proportional content may range from one half of one per cent. of the entire combined composition to many times that amount. A free flowing coating material within the meaning of this description is one which, when an article is dipped into it and held up to drain, will run off sufficiently to leave a coating of substantially uniform thickness on the surfaces of the article, (disregarding masses of the composition retained by capillarity at the lowest points of the article). A self-leveling material is one which, after being spread by a brush, will afterwards spread under the action of gravity so as substantially to obliterate brush marks.

The foregoing illustrate, without being an exhaustive recital of, the uses to which my basic composition may be applied, and some of the useful products of which the said composition is an important ingredient. Even though the basic composition is a minor, or even a minute, part of the entire product, so far as volumetric content is concerned, nevertheless it is highly important functionally. It develops properties in the combinations in which it is used which the other and major ingredients of such combined compositions lack, including properties which are either lacking in previously known substances and compositions or exist in very inferior measure.

What I claim and desire to secure by Letters Patent is:

1. A composition of matter for preserving protein-containing materials which are subject to decomposition and for other useful purposes consisting of a solvent of resins from the group consisting of tetrahydronaphthalene, and decahydronaphthalene; a hydrogenated phenol as a plasticizer; and a wetting agent.

2. A composition of matter as and for the purposes set forth, consisting of a solvent of resins from the group consisting of tetrahydronaphthalene, and decahydronaphthalene; a hydrogenated phenol as a plasticiser; and a wetting agent selected from the group consisting of sulfonated castor oil, sulfonated olive oil, and a sulfonated alkylene compound.

3. A composition of matter as and for the purposes set forth, consisting of a solvent of resins, a plasticiser from the group consisting of hexahydrophenol and hexahydrocresol, and a wetting agent.

4. A composition of matter as and for the purposes set forth consisting of a solvent of resins, a hydrogenated phenol as a plasticiser, and a wetting agent selected from the group consisting of sulfonated castor oil, sulfonated olive oil, and a sulfonated alkylene compound.

5. A composition of matter for preserving protein-containing materials which are subject to decomposition and for other useful purposes consisting of a solvent of resins from the group consisting of tetrahydronaphthalene and decahydronaphthalene; a hydrogenated phenol as a plasticiser; and a wetting agent; in which the proportional contents of the several ingredients are in the order of three parts of the rubber solvent to one part of the plasticiser to two parts of the wetting agent.

6. A composition of matter for preserving protein-containing materials which are subject to decomposition and for other useful purposes consisting of tetrahydronaphthalene, hexahydrophenol, and a wetting agent.

7. A composition of matter for preserving protein-containing materials which are subject to decomposition and for the other useful purposes consisting of tetrahydronaphthalene, hexahydrophenol, and sulfonated castor oil.

8. A preservative composition adapted to preserve alkaline solutions of casein from decomposition, gelling, or substantial change in viscosity, consisting of the composition set forth in claim 1 together with a suitable content of urea or urea ammonia liquor.

9. A preservative composition adapted to preserve alkaline solutions of casein from decomposition, gelling, or substantial change in viscosity, consisting of the composition set forth in claim 2, together with a suitable content of urea or urea ammonia liquor.

10. A preservative composition adapted to preserve alkaline solutions of casein from decomposition, gelling, or substantial change in viscosity, consisting of the composition set forth in claim 3, together with a suitable content of urea or urea ammonia liquor.

11. A preservative composition adapted to preserve alkaline solutions of casein from decomposition, gelling, or substantial change in viscosity, consisting of the composition set forth in claim 4, together with a suitable content of urea or urea ammonia liquor.

12. A preservative composition adapted to preserve alkaline solutions of casein from decomposition, gelling, or substantial change in viscosity, consisting of the composition set forth in claim 5, together with a suitable content of urea or urea ammonia liquor.

13. A preservative composition adapted to preserve alkaline solutions of casein from decomposition, gelling, or substantial change in viscosity, consisting of the composition set forth in claim 6, together with a suitable content of urea or urea ammonia liquor.

14. A preservative composition adapted to preserve alkaline solutions of casein from decomposition, gelling, or substantial change in viscosity, consisting of the composition set forth in claim 7, together with a suitable content of urea or urea ammonia liquor.

15. A composition adapted to serve as a liquid vehicle for pigments, fillers, waxes and the like, or as an adhesive, consisting of a solution of casein containing a minor proportion of the composition set forth in claim 1 and a minor proportion of urea or urea ammonia liquor.

16. A composition adapted to serve as a liquid vehicle for pigments, fillers, waxes and the like, or as an adhesive, consisting of an alkaline solution of casein containing a minor proportion of the composition set forth in claim 2 and a minor proportion of urea or urea ammonia liquor.

17. A composition adapted to serve as a liquid vehicle for pigments, fillers, waxes and the like, or as an adhesive, consisting of an alkaline solution of casein containing a minor proportion of the composition set forth in claim 3 and a minor proportion of urea or urea ammonia liquor.

18. A composition adapted to serve as a liquid vehicle for pigments, fillers, waxes and the like, or as an adhesive, consisting of an alkaline solution of casein containing a minor proportion of the composition set forth in claim 4 and a minor proportion of urea or urea ammonia liquor.

19. A composition adapted to serve as a liquid vehicle for pigments, fillers, waxes and the like, or as an adhesive, consisting of an alkaline solution of casein containing a minor proportion of the composition set forth in claim 6 and a minor proportion of urea or urea ammonia liquor.

20. A composition consisting of an alkaline solution of casein, a quantity of urea amounting to substantially 5% of the weight of casein, and a quantity of the composition set forth in claim 1 amounting to substantially 2% of the weight of solids in the urea casein mixture.

21. A composition consisting of an alkaline solution of casein, a quantity of urea amounting to substantially 5% of the weight of casein, and a quantity of the composition set forth in claim 4 amounting to substantially 2% of the weight of solids in the urea casein mixture.

22. A composition consisting of an alkaline solution of casein, a quantity of urea amounting to substantially 5% of the weight of casein, and a quantity of the composition set forth in claim 5 amounting to substantially 2% of the weight of solids in the urea casein mixture.

23. A composition consisting of an alkaline solution of casein, a quantity of urea amounting to substantially 5% of the weight of casein, and a quantity of the composition set forth in claim 7 amounting to substantially 2% of the weight of solids in the urea casein mixture.

24. A paint consisting of an alkaline solution of casein, compounded with a minor proportion of the composition of matter set forth in claim 1, and a minor proportion of urea or urea ammonia liquor, and containing coloring matter.

25. A coating composition consisting of an alkaline solution of casein compounded with a minor proportion of the composition of matter set forth in claim 1, and a minor proportion of urea or urea ammonia liquor, and containing wax in dispersed condition throughout the solution.

26. A coating composition consisting of an alkaline solution of casein compounded with a minor proportion of the composition of matter set forth in claim 4, and a minor proportion of urea or urea ammonia liquor, and containing wax in dispersed condition throughout the solution.

27. A coating composition consisting of an alkaline solution of casein compounded with a minor proportion of the composition of matter set forth in claim 6, and a minor proportion of urea or urea ammonia liquor, and containing wax in dispersed condition throughout the solution.

CHARLES M. ALBION.